Nov. 19, 1929. C. CAMPBELL 1,736,485
DIRECTION SIGNALING DEVICE FOR VEHICLES
Filed July 14, 1928
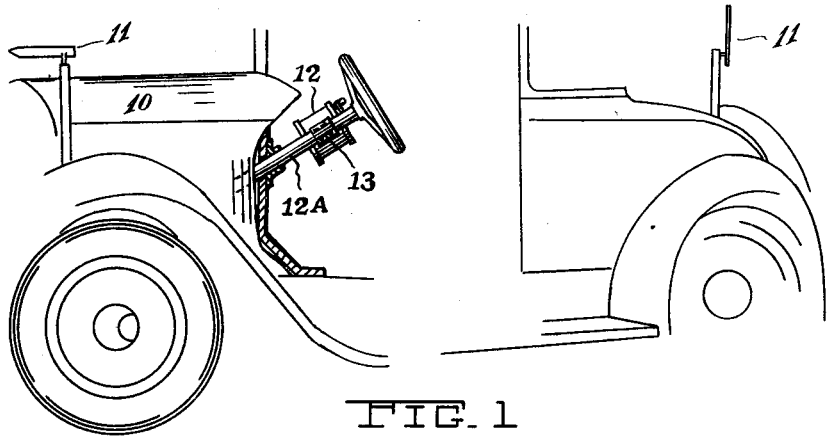
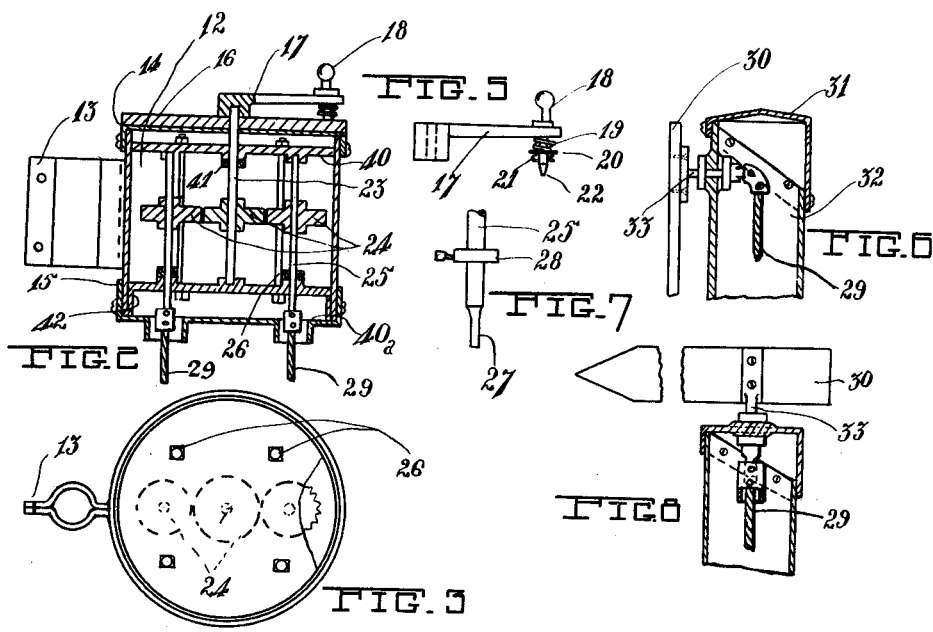
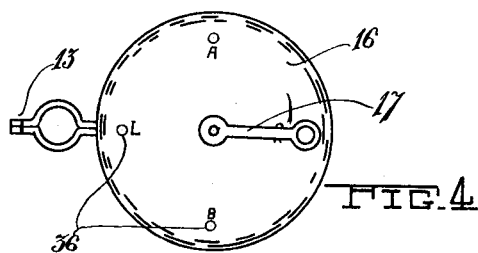
INVENTOR
C. Campbell.
BY E.J. Featherstonhaugh
ATTORNEY Patented Nov. 19, 1929

1,736,485

UNITED STATES PATENT OFFICE

CORNELIUS CAMPBELL, OF EDMONTON, ALBERTA, CANADA

DIRECTION-SIGNALING DEVICE FOR VEHICLES

Application filed July 14, 1928. Serial No. 292,795.

This invention relates to a vehicle direction signaling device, as described in the present specification and illustrated in the accompanying drawings which form part of the same.

The invention consists essentially of the novel features pointed out broadly and specifically in the claims for novelty following a description containing an explanation in detail of an acceptable form of the invention.

The objects of the invention are to build a direction signaling device for vehicles, capable of signaling the four usual directions of travel, namely, "right", "left", "ahead" and "back"; to so construct the control mechanism that a signaling unit can be placed both at the rear and front of the vehicle, both units operating simultaneously; to make such a signaling device of simple construction and positive of operation; and generally, to improve upon existing such devices.

In the drawings:

Figure 1 is a fragmentary perspective view of an automobile of conventional design, equipped with a signaling device built and operating in accordance with this invention;

Figure 2 is a cross-section of the box containing the control mechanism;

Figure 3 is a top plan view of Figure 2, (with the cover or lid removed);

Figure 4 is a top plan view of Figure 2;

Figure 5 is a side view of the operating handle and detent;

Figure 6 is a fragmentary cross-section of the post mounting the rear signaling arm;

Figure 7 is a portion of one of the shafts designated as numeral 25 in Figure 2;

Figure 8 is a fragmentary cross-section of the post mounting the front signaling arm.

Like numerals of reference indicate corresponding parts in the various figures.

Referring to the drawings, 10 designates an automobile of conventional design upon which is mounted, front and rear, a signaling device 11. The devices are located as conveniently as possible so as to be clearly seen from positions to the front and to the rear, respectively, of the automobile.

The signaling arm or member 30 may be made to any approved construction such as a plain board as suggested in the drawings—with or without a red light in the centre thereof—or may take the form of a hand, a baton, etc., the particular form of arm used being a matter of choice. The arm 30 has the shaft 33 rigid therewith, the shaft being suitably journalled in a substantially upright hollow post 32 having the removable lid 31.

The top of the post is finished on a slant to facilitate access therinto when the lid is removed, and more particularly to give better access to the shaft 33 as the spiral spring or flexible power transmission 29 is being fastened thereto. The front device is so mounted that the arrow or signaling arm will point ahead, to right, to left, and rearwardly; in other words, it is mounted on a vertical axis so that it may revolve in a horizontal plane. The rear device on the other hand, is so mounted that it will point upwardly, meaning "ahead", to right, to left, and downwardly, meaning that the car is to be backed; in other words this signaling arm is mounted on a horizontal axis so that it may revolve in a vertical plane at right angles to the axis of the automobile.

The control box 12 takes the shape of a cylinder and is fastened to the driving post 12A preferably, as with resilient clamps 13. The signal arms are both operated simultaneously by the control lever 17 rigid on the end of the shaft 23, a gear 24 rigid on the said shaft meshing with two other similar gears 24 rigid on the shaft 25 respectively. The transmission coiled spring 29, which may be substituted by the usual wire or chain transmission, operatively connects the two shafts 25 to the two signaling unit arm shafts 33, respectively, the shafts being flattened as suggested at 27 in Figure 7 to receive the springs.

The shafts 25 are journalled in spaced plates 40 and 40A, the shafts having each a shoulder or collar 28 bearing on the plate 40A and extending below the removable bottom lid 15; the shaft 23 has the shoulder or collar 41 engaging the plate 40, and extends upwardly through the lid 14 and index plate 16 to receive the turn handle or lever 17. The plates are tied in their spaced relation by suitable tie rods 26. The plates 40 and 40A and the shafts and gears mounted therebetween can be deposited into the box 12 and removed therefrom bodily, by removing the lid 14; the bottom plate 40A rests upon the shoulder 42 formed in the box 12.

A detent device is used to lock the arm 30 in four different operative positions, namely, right, left, ahead and back, and may consist of the knob 18 the stem of which is slidably mounted in the handle 17 and has the lower end pointed as at 22 to engage into four spaced holes 36 in the index plate 16, corresponding with the four positions right, left, ahead and back; as will be seen by referring to Figure 5 of the drawings, the knob 18, and more particularly the end of the stem, is forced downwardly to bear upon the plate 16 by providing a spring 19 surrounding the stem and compressed between the handle and washer 20 which rests on the cotter 21.

*Operation.*—The signaling arms are normally left in the "ahead" position, that is with the detent stem 22 engaging in the perforation shown as A on the index plate 16. If the driver wishes to make a left turn he operates the detent mechanism and lever 17 to the position L on the index plate. In the same way the driver can signal an intended turn to the right or movement rearwardly. Any rotation of the handle 17 is imparted to the shaft 23, rotating the gears 24 and therefore the transmission members 29. The transmission members 29 are enclosed in suitable flexible metal pipes or sheaths.

What I claim as my invention is:

1. In a control for automobile signaling devices a box adapted to be positioned in proximity to the driving wheel of said automobile and having an index plate, a pair of shafts, each having a gear rigid therewith flexible transmission members operatively connected between said signaling members and said shafts respectively, a third shaft journalled in said box in parallel arrangement with said first-mentioned shafts and having a gear rigid therewith meshing with said first mentioned gears, a handle rigid on said third shaft, and a detent device on said handle co-acting with said index plate and releasably locking said third shaft in predetermined positions.

2. In a control for automobile signaling devices, a box having a removable top cover and resilient clamps adapted for fastening to the driving post of an automobile, a pair of spaced plates removably carried by said box, a pair of shafts journalled in said spaced plates and each having a gear rigid therewith, a third shaft also journalled in said spaced plates and having a gear rigid therewith meshing with said first-mentioned gears, said first-mentioned shafts extending through said box and being adapted for connection with flexible transmission means, an index plate secured to said top cover of said box, an index handle rigidly secured to said third shaft adjacent said index plate and co-operating therewith, and a detent device on said handle co-acting with said index plate and releasably locking said third shaft in predetermined positions.

Signed at Edmonton, Alberta, this 22nd day of May, 1928.

CORNELIUS CAMPBELL.